United States Patent [19]

della Porta et al.

[11] 3,949,460
[45] Apr. 13, 1976

[54] METHOD OF MANUFACTURING NUCLEAR FUEL ELEMENTS

[75] Inventors: Paolo della Porta; Tiziano Anselmo Giorgi; Livio Rosai, all of Milan, Italy

[73] Assignee: S.A.E.S. Getters S.p.A., Milan, Italy

[22] Filed: Apr. 30, 1974

[21] Appl. No.: 465,724

[30] Foreign Application Priority Data
June 13, 1973 Italy .................................. 25355/73

[52] U.S. Cl. .................. 29/428; 29/400 N; 176/68
[51] Int. Cl.² ........................................ B21D 39/03
[58] Field of Search ............ 29/428, 400 N; 176/68, 176/37, 67, 70, 66, 79

[56] References Cited
UNITED STATES PATENTS

| | | |
|---|---|---|
| 3,141,830 | 7/1964 | Klepfer et al. .......................... 176/68 |
| 3,519,537 | 7/1970 | Ferrari .................................. 176/68 |
| 3,683,148 | 8/1972 | Boyko et al. ........................... 176/79 |
| 3,762,995 | 10/1973 | Gulbransen et al. ................... 176/68 |
| 3,774,010 | 11/1973 | Heer et al. ............................. 176/68 |
| 3,836,431 | 9/1974 | Flipot et al. ........................... 176/79 |

*Primary Examiner*—C. W. Lanham
*Assistant Examiner*—James R. Duzan
*Attorney, Agent, or Firm*—Littlepage, Quaintance, Murphy & Dobyns

[57] ABSTRACT

A method of manufacturing a nuclear fuel element which contains a pre-activated non-evaporable getter material such that the getter material starts to sorb gas at a temperature lower than the temperature at which the fuel element walls start to sorb gas which getter action at least partially takes place at subatmospheric pressure.

19 Claims, 1 Drawing Figure

U.S. Patent  April 13, 1976  3,949,460
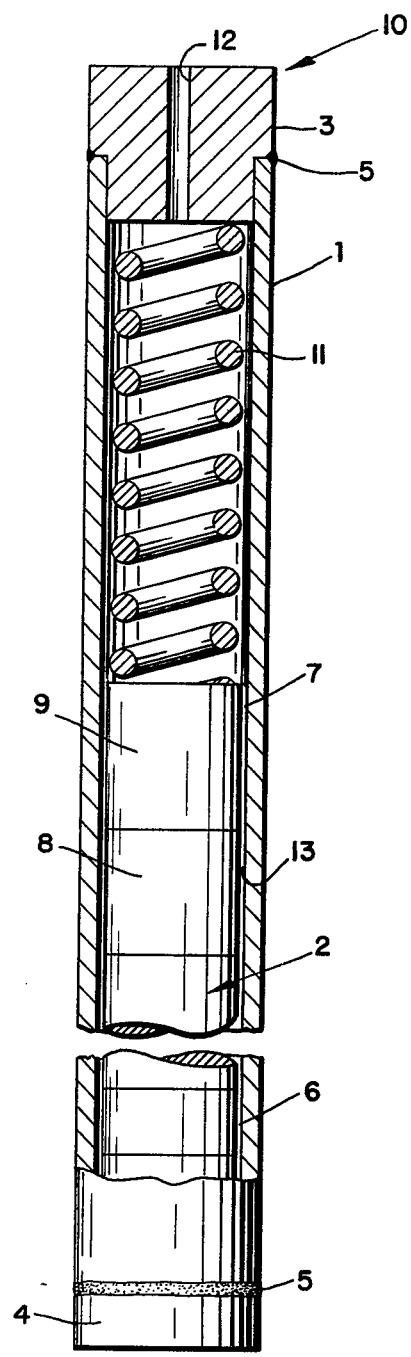

3,949,460

METHOD OF MANUFACTURING NUCLEAR FUEL ELEMENTS

FIELD OF THE INVENTION

This invention relates to a method of manufacturing nuclear fuel elements and in particular it relates to fuel elements composed of a metal tube containing fissionable material and a non-evaporable getter material capable of sorbing gases at near ambient temperatures.

DESCRIPTION OF THE PRIOR ART

A common type of power reactor fuel element currently in use consists of a refractory ceramic fuel contained within a sealed thin walled tubular sheath that is disposed in a pressurised water atmosphere.

Such fuel elements produce fission product gases from the fuel, which gases exert an internal pressure within the fuel element sheath. The cyclical operations of a power reactor over a given period of time, such as 24 hours results in extreme variations in temperature and pressure externally as well as internally of the fuel element.

These variations of internal and external pressure subject the sheath of the fuel element to forces which can lead to rupture due to fatigue strain of the metal forming the sheath or cladding.

The sheath serves two main purposes: first, to prevent contact and chemical reactions between the nuclear fuel and either the coolant or moderator if present, or both: and second, to prevent the highly radioactive fission products, some of which are gases, from being released into the coolant or moderator, or both. Common sheath materials are stainless steel, aluminium and its alloys, zirconium and its alloys, niobium, yttrium and their alloys, certain magnesium alloys and others. The rupture of this sheath can contaminate the coolant or moderator and the associated systems with highly radioactive products to a degree which interferes with plant production.

Serious problems have been encountered in the manufacture and operation of nuclear fuel elements which employ certain metals and alloys as the sheath material, due to the reactivity of these materials under certain circumstances. Zirconium and its alloys under normal circumstances are excellent materials for a nuclear fuel sheath as they have low neutron cross sections and at temperatures below about 300° C are extremely stable and non-reactive in the presence of demineralized water or steam which are commonly used as reactor coolants and moderators.

At higher temperatures, however, the protective oxide film on the surface of these materials appears to fail more rapidly and the material deteriorates apparently due to exposure at these temperatures to water and water vapour.

It is also adversely affected by such active gases as hydrogen, oxygen, nitrogen, carbon monoxide, and carbon dioxide at all temperatures.

Sintered refractory and ceramic compositions, such as uranium dioxide and others used as nuclear fuels release measurable quantities of one or more of the above mentioned gases during manufacture or irradiation of the metal sheathed fuel element, even though these gases have been excluded as far as possible from the ambient atmosphere during manufacture of the sheath and fuel element. These gases react with the zirconium base sheath material containing the nuclear fuel. The results of this reaction include embrittlement of the sheath which can lead to premature failure of the fuel element. Although water and water vapour do not react directly to produce this result, at high temperatures water vapour does react with zirconium to produce hydrogen and this gas further reacts with the zirconium to cause embrittlement.

Monatomic gases such as krypton and xenon are also produced as fission reaction products.

The provision of a controlled amount of gas pressure within the fuel element is desirable to offset at least a major portion of the external pressure of the pressurized water coolant to the extent that it reduces the problem of excessive strain and early fatigue of the sheath.

In an attempt to solve some of these problems it has been proposed to use activated charcoal, alumina or molecular sieves placed at an extremity of the fuel element as described in U.S. Pat. No. 3,519,537. However these materials appear to be effective only during reactor operation and their effect is to maintain the internal fuel element rare gas pressure at a more constant value. Furthermore their action in controlling the rare gas pressure is inhibited by the presence of even minute traces of other gases.

An attempt to reduce embrittlement of the sheath material has been made by providing the fuel element with a compact of material, capable of sorbing active gases, within a cavity situated in an end closure as described in U.S. Pat. No. 3,141,830. The preferred material of the compact is zirconium having a bulk density of between about 50% and 85% of the theoretical density of the metal from which it is made. Whilst this technique has had some success in reducing the number of fuel element sheath failures, due to fatigue effects following sheath embrittlement by gas sorption, the number of failures still occurring is troublesome. Furthermore the life of the fuel element is still not as long as would be desired. This probably occurs because it is necessary to heat the gas sorbing or gettering compact to a high temperature before it is able to start sorbing gas. The sheath walls are also heated to this high temperature and become capable of sorbing the active gas leading to embrittlement.

To reduce the amount of water vapour and other gases contained within the nuclear fuel compositions it is customary to degass the nuclear fuel elements immediately prior to final closure of the elements by welding of an end cap to the tubular sheath. This degassing process consists of maintaining the fuel element at an elevated temperature in a controlled environment which may be a vacuum or an inert gas. The degassing may be accompanied by a periodic flushing of inert gas by means of periodically increasing and decreasing its pressure thus causing it to flow into and out of the fuel element scavenging it of released gas and vapour as is performed in some types of electron tube such as fluorescent lamps. However, the apparatus required to perform this process is expensive and complex.

Accordingly it is an object of the present invention to provide a method of manufacturing a nuclear fuel element which is substantially free of one or more of the disadvantages of previous nuclear fuel elements.

Another object of the present invention is to provide an improved method of manufacturing nuclear fuel elements;

A further object is to provide an improved method of manufacturing nuclear fuel elements which allows the removal of the maximum amount of gas and water vapour from the fuel compositions before insertion of the fuel elements in the nuclear reactor.

A further object if to provide an improved method of manufacturing nuclear fuel elements which have a longer life within a nuclear reactor.

Another object of the present invention is to provide a process for manufacturing a nuclear fuel element containing an internal gas sorption means capable of starting to sorb active gases at temperatures lower than the temperature at which the fuel element sheath walls start to sorb gas.

Additional objects and advantages of the present invention will be apparent by reference to the following detailed description thereof and drawing wherein:

The drawing FIGURE is a sectional view of a nuclear fuel element.

According to the present invention there is provided a process for manufacturing a nuclear fuel element which contains a preactivated non-evaporable getter material such that the getter material starts to sorb gases at a temperature lower than the temperature at which the fuel element walls start to sorb gas.

In the manufacture of a nuclear fuel element containing fuel pellets and a plenum changer the latter stages consist of heating of the fuel element, partially evacuated, to remove water vapour and other unwanted gases from the fuel pellets and other internal surfaces of the fuel element. A flow of purging or washing gas, such as nitrogen is often used, and after further evacuation the fuel element is back filled to a super-atmospheric pressure with He, then the fuel element is sealed. The sealing process, of the end cap to the sheath, is usually a welding operation which creates sufficient heat to activate a getter material resting upon the end cap, or placed in a recess in the end cap. The temperature reached is sufficient to also activate the internal surfaces of the end cap and sheath surfaces near the end cap.

Further water vapour and other unwanted gases released on subsequent heating of the fuel element would be sorbed by the activated sheath walls as well as the getter leading to embrittlement and early fuel element failure.

In the method of the present invention a getter material is activated before being placed in the fuel element. In this way, sealing methods can be adopted which ensure that the internal surfaces of the fuel element do not reach temperatures at which they are activated. The fuel element, containing the getter device can then be subsequently aged to drive off water vapour and other unwanted gases from the fuel pellets and other internal surfaces which are then sorbed only by the getter material and not by the fuel element sheath or end caps.

The getter device can be in the form of a sintered mass with or without a metal or graphite holder or metal rings. It can be activated by heating to about 950° C for a few minutes, depending upon the getter material used, immediately prior to insertion within the fuel element.

Any conventional technique may be used to activate the getter material such as induction heating, heating by infra-red radiation or by direct contact with a heated surface. This activation can take place in a vacuum or inert gas filled chamber such as a glove-box to which the fuel element is also attached so that the activated getter can be placed in the fuel element immediately prior to sealing the end cap to the fuel element sheath.

An alternative method of introducing the getter material is to place the getter material, already activated, within a sealed container having a vacuum or inert atmosphere. The container can then be opened within the vacuum or inert gas filled chamber to which the fuel element is attached. The getter device is removed from the container and placed in the fuel element which is subsequently sealed.

Immediately before sealing off the fuel element the pressure inside the element is reduced to a subambient pressure and generally below $10^{-1}$ torr and preferably below about $10^{-2}$ torr.

After the insertion of the getter material and reduction of the pressure, the fuel element can be sealed by techniques such as electron beam welding (argon arc welding, or laser beam welding, or other techniques), which, due to localization of heating, does not cause the internal fuel element surfaces to reach such temperatures that they become active. The temporarily sealed off fuel element can now be removed from the chamber and stored for a period of time at a temperature above ambient but below that temperature at which the fuel element sheath starts to sorb gas.

If the ageing process is carried out with the internal gas pressure at too high a value, such as the 20 atmospheres of rare gas normally present in the fuel element which is often required to oppose the external ambient pressures when functioning in a nuclear reactor, the diffusion rates of other gases or vapours through the rare gas are reduced to very low values.

The gases and/or vapours such as water vapour released from the fuel pellets find their way into the space between the pellets and the fuel element walls and they then diffuse towards the plenum chamber to be sorbed by the getter material. If the rare gas pressure is too high then the diffusion process of the gases or vapours is very slow and some weeks or even months of ageing may be required to reduce the concentration of the impurity gases or vapours by an appreciable amount. This is especially true for the regions of the fuel element remote from the plenum chamber as the gases or vapours must travel or diffuse over comparatively long distances. The change of diffusion speed of the impurity gases or vapours is much less affected by changes in temperature than it is by changes of pressure in the gas through which they are diffusing. Long ageing times are not economical for reasons of power consumption required to maintain the fuel elements at elevated temperature and even for such simple reasons that the fuel elements occupy space for the period of ageing.

It is therefore desirable to maintain the internal pressure of the fuel element at a low pressure during the ageing process such that the gases and/or vapours, such as water vapour, released from the fuel pellets and finding their way into the space between the fuel pellets and fuel element walls can then easily diffuse towards the plenum chamber where they are sorbed by the getter material. The ageing under vacuum conditions within the fuel element allows the removal, by the getter material, of the unwanted gases or vapours in a much shorter time than that required if the fuel element contained a rare gas at super-atmospheric pressure. The economic advantages of ageing with a vacuum inside the fuel element are appreciable.

It will be appreciated that the rate of diffusion of the gases and/or vapours out of the fuel pellets will also take part in determining the length of time that the fuel elements must be aged and the optimum vacuum that must be created within the fuel element. For instance it is uneconomic to create a very high vacuum if the diffusion of the gases or vapours out of the pellets is low compared to their diffusion along the space between the pellets and fuel element walls towards the plenum chamber and gas sorbing getter material. If the gas or vapour diffusion rate out of the pellets is high then it may be economic to produce a relatively high vacuum within the fuel element before starting the ageing process. The relative importance of the two diffusion rates is determined by the materials from which the fuel pellets have been constructed and their pretreatment conditions.

This heating which is preferably at temperatures between about 120° and 250° C is highly desirable to remove water and other gases from the sintered fuel compacts or pellets due to diffusion of these gases through the sintered compacts. The water vapour and other gases after diffusion out of the sintered compact further diffuse into the plenum chamber and are sorbed by the getter material. It is undesirable to have a temperature below about 120° C as the diffusion of water vapour and other gases become too slow or ceases altogether. If the temperature is raised substantially above 250° C the internal surfaces of the fuel element may start to become active and start to sorb some of the water vapour or other gases which have not yet been completely removed by the getter material.

The getter device should be sufficiently robust and non-resilient so that on thermal expansion, when the fuel element is raised to the operating temperature of the nuclear reaction, it can act to partially support the thin wall of the fuel element sheath against the pressurised water atmosphere.

Getter materials useful in the present invention can in general be any non-evaporable getter material which is capable of being activated to render it gas sorptive. Activation consists of heating the getter material in a vacuum or inert atmosphere such that surface oxides or other compounds, which prevent the getter material from sorbing gas, are removed leaving a clean gas sorptive surface which can sorb active gases.

Examples of non-evaporable getter materials are Zr, Ta, Hf, Nb, Ti, Th and U, alloys and mixtures of one or more of these metals among themselves and with other metals such as aluminium which alloys have satisfactory gettering properties.

A preferred non-evaporable getter material for use in the present invention is an alloy of from 5 to 30 and preferably 13 to 18 weight percent aluminium balance zirconium. The most preferred composition is an alloy of 16 percent aluminium balance zirconium available from SAES Getters S.p.A. Milan, Italy, under the trademark St 101.

Another preferred non-evaporable getter material is a mixture of particulate zirconium with particulate graphite as described in U.S. Pat. No. 3,584,253 in which the weight ratio of graphite: zirconium is from 1:100 to 3:7.

A further preferred non-evaporable getter material is a mixture of particulate zirconium with a particulate alloy of zirconium and aluminium as described in Italian patent application No. 28053 A/72 of 10th Aug. 1972 wherein the weight ratio of zirconium: aluminium alloy is between 19:1 and 2:3 and preferably between 10:1 and 1:1. The zirconium aluminium alloy preferably has a weight percentage aluminium of from 5 to 30 and preferably 13 to 18 balance zirconium. The most preferred composition is an alloy of 16 percent aluminium balance zirconium.

These compositions are preferred because they exhibit high gettering speeds and high sorption capacities at temperatures lower than the temperature at which the fuel element walls start to sorb gas.

At the end of the extended period of heating the nuclear fuel element is back-filled with a super-atmospheric pressure of helium and resealed.

In the cases when a passivation treatment is given to the outside surface of the nuclear fuel element, to augment the atmospehrically formed oxide coating, such as by heating in a water vapour atmosphere for approximately 24 hours at about 400° C this can advantageously be performed before the extended period of heating. However it can be performed after the process of back filling with helium gas passivating the final seal. Even during the passivation treatment of the getter material continues to sorb unwanted gas.

Referring now to the drawing figure there is shown a nuclear fuel element 10 produced by a method of the present invention which is particularly suitable for use in a pressurized water type of power reactor.

Fuel element 10 includes a sheath 1 enclosing a plurality of fuel pellets or cylinders 2 disposed in butting relationship one with another. Each end of sheath 1 is closed by means of end caps 3 and 4. Annular welds 5 between end caps 3 and 4 and sheath 1 ensure a hermetic sealing of the fuel element 10. The majority of the internal volume of fuel element 10 is occupied by fuel element pellets 2 in a fuel chamber 6 while the remaining volume forms a plenum chamber 7. Within plenum chamber 7 is placed a thermal insulator 8 in contact with the uppermost fuel pellet. In contact with thermal insulator 8 is placed a getter device 9 held in position by one end of pressure spring 11. The other end of pressure spring 11 rests against end cap 3. End cap 3 further contains a hermetically sealable bore hole 12 used during fabrication of fuel element 10.

Clearance space 13 also allows gas and water vapour to diffuse towards getter device 9 during the ageing process.

Sheath 1 is composed of a metal which is substantially inert to the environment of the reactor. Due to the relatively low neutron absorption of zirconium it is common to use zirconium based alloys such as zircalloy-2 or zircalloy-4 as the sheath material to effect savings through the use of uranium of lower enrichment and through the reduction in the critical mass of uranium.

The invention is further illustrated by the following examples in which all parts and percentages are by weight unless otherwise indicated. These non-limiting examples are illustrative of certain embodiments designed to teach those skilled in the art how to practice the invention and to represent the best mode for carrying out the invention.

EXAMPLE 1

Particulate zirconium is mixed with a particulate 16 percent Al—84 percent Zr alloy in the ratio Zr:Zr—Al=3.2. This mixture is then made into a fairly fluid paste in the form of an alcoholic suspension. A graphite mould having a 1 mm wall thickness and defining a cylindrical volume 10 mm in height and 9 mm in diameter is filled with the paste. The graphite mould containing the paste is placed in a vacuum of about $10^{-5}$ to $10^{-6}$ torr.

The temperature is increased from room temperature to between 800° and 1000° C during a period of 25 minutes. The temperature between 800° and 1000° C is maintained for a period of 5 minutes. The moulds are removed from the furnace after cooling to room temperature. The cylinder of getting material is removed from the mould. A total of five cylinders is made. The five cylinders are placed in a stainless steel container and attached to a conventional high vacuum pumping system by means of a metal pumping stem. The steel container is degassed by heating to 350° C for 2 hours at $10^{-7}$ torr pressure and then the getter material cylinders are activated by heating to 850° C for 10 minutes. When the pressure is again at $10^{-7}$ torr or less and when the cylinders have cooled to room temperature the metal pumping stem is pinched-off and the steel container containing the five getter cylinders is removed.

Five nuclear fuel element sheaths are taken and an end cap is attached to one of their ends. Fuel pellets are inserted within the sheath, the last pellet being replaced by a disc of $ZrO_2$ heat insulator, leaving an empty plenum chamber. Within a controllable atmosphere working vessel the fuel elements are evacuated to a pressure of about 1 torr and heated up to 200° C for 6 hours. The fuel elements are back filled with nitrogen and then re-evacuated to 1 torr. These steps are repeated 5 times during the 6 hours heating. The working vessel is then flushed with helium. Still within the working vessel and steel container containing the five getter cylinders is opened and one getter cylinder is placed in each of the fuel element plenum chambers. The pressure is then reduced to less than $10^{-1}$ torr. A stainless steel spring is inserted and the second end cap is placed in position. The end cap is welded to the fuel element sheath by electron beam welding which maintains the heat generated mainly localized in the region of the weld. The fuel element is hermetically sealed by electron beam welding. The fuel element is removed and stored at a temperature of 175° C for 4 weeks. The fuel elements are then opened in an inert atmosphere and back filled with helium to a pressure of 20 atmospheres. The fuel elements are irradiated in a nuclear reactor and after a period of time are inspected. They show no signs of fatigue or embrittlement.

EXAMPLE 2

Fuel elements are prepared as in U.S. Pat. No. 3,141,830 except that after preparation the fuel elements are stored at a temperature of 175° C for 4 weeks. The fuel elements are irradiated in a nuclear power reactor and after a period of time they are inspected. Some of the fuel elements show signs of fatigue and embrittlement.

Although the invention has been described in considerable detail with reference to certain preferred embodiments thereof, it will be understood that variations and modifications can be effected within the spirit and scope of the invention as described above and defined in the appended claims.

What is claimed is:

1. A method of manufacturing a nuclear fuel element comprising a metallic container having walls forming a fuel containing chamber and a plenum chamber, a body of fissionable material within the fuel containing chamber comprising the steps of
   A. pumping the fuel element to sub-atmospheric pressure
   B. inserting a non-evaporable activated getter material into the plenum chamber
   C. heating the fuel element and getter material to a temperature below that at which the fuel element walls commence to sorb gas
   D. filling the fuel element with helium to super atmospheric pressure.

2. A method of manufacturing a nuclear fuel element comprising a metallic container having walls forming a fuel containing chamber and a plenum chamber, a body of fissionable material within the fuel containing chamber comprising the steps of
   A. pumping the fuel element to sub-atmospheric pressure
   B. heating the fuel element to a temperature below that at which the fuel element walls commence to sorb gas
   C. filling the fuel element with a washing gas
   D. pumping the fuel element to sub-atmospheric pressure
   E. inserting a non-evaporable activated getter material into the plenum chamber
   F. heating the fuel element and getter material to a temperature below that at which the fuel element walls commence to sorb gas
   G. filling the fuel element with helium to super-atmospheric pressure.

3. A method of claim 2 in which steps A to D are performed two or more times.

4. A method of claim 2 in which the washing gas is nitrogen.

5. A method of claim 2 in which the washing gas is a rare gas.

6. A method of claim 5 in which the washing gas is helium.

7. A method of claim 1 in which the sub-atmospheric pressure is less than $10^{-1}$ torr.

8. A method of claim 2 in which the sub-atmospheric pressure of step D is less than $10^{-1}$ torr.

9. A method of claim 1 in which the temperature of step C is between 120° and 250° C.

10. A method of claim 2 in which the temperature of step B is between 150° and 250° C.

11. A method of claim 2 in which the temperature of step F is between 120° and 250° C.

12. A method of claim 1 or 2 in which the last step is followed by a further step of sealing the fuel element.

13. A method of claim 1 or 2 in which the nuclear fuel element is temporarily sealed after insertion of the getter material.

14. A method of claim 1 or 2 in which the non-evaporable getter material is chosen from the group Zr and Zr—Al alloys either alone or in mixture between themselves or mixed with graphite.

15. A method of claim 14 in which the non-evaporable getter material comprises
   A. particulate zirconium and
   B. a particulate alloy of zirconium and aluminium in which the weight ratio of A:B is between 19:1 and 2:3.

16. A method of claim 15 in which the zirconium-aluminium alloy is of 16 weight percent aluminium balance zirconium.

17. A method of manufacturing a nuclear fuel element comprising a zircalloy container having walls forming a fuel containing chamber and a plenum chamber, a body of fissionable material within the fuel containing chamber comprising the steps of
   A. pumping the fuel element to sub-atmospheric pressure
   B. heating the fuel element to a temperature between 150° and 250° C
   C. filling the fuel element with nitrogen
   D. pumping the fuel element to a pressure below $10^{-1}$ torr
   E. inserting a non-evaporable activated getter material into the plenum chamber
   F. temporarily sealing of the fuel element
   G. heating the temporarily sealed fuel element and getter material to a temperature between 120° and 250° C
   H. breaking the temporary seal
   I. filling the fuel element with helium to super-atmospheric pressure
   J. sealing the fuel element 18. A method of manufacturing the nuclear fuel element comprising a metallic container having walls forming a fuel containing chamber and a plenum chamber, a body of fissionable material within the fuel containing chamber comprising the steps of:
   I. inserting a non-evaporable activated getter material into the plenum chamber;
   II. maintaining the fuel element at a temperature between 120° and 250° C and at a pressure less than $10^{-1}$ torr for a period of time and then;
   III. filling the container with helium at a super-atmospheric pressure.

19. A method of manufacturing a nuclear fuel element comprising a metallic container having walls forming a fuel containing chamber and a plenum chamber, a body of fissionable material within the fuel containing chamber, one end of the container being closed by a first end cap, the other end of the container being adapted to be closed by a second end cap, said method comprising the steps of:
   I. inserting a non-evaporable activated getter material into the plenum chamber;
   II. hermetically sealing the second end cap while maintaining the pressure within the chamber at less than $10^{-1}$ torr, and then;
   III. storing the fuel element at 175° for 4 weeks, and then;
   IV. filling the chamber with helium at a super-atmospheric pressure.

\* \* \* \* \*

UNITED STATES PATENT AND TRADEMARK OFFICE
CERTIFICATE OF CORRECTION

PATENT NO. : 3,949,460
DATED : April 13, 1976
INVENTOR(S) : Paolo della Porta et al.

It is certified that error appears in the above-identified patent and that said Letters Patent are hereby corrected as shown below:

| COLUMN | LINE | ERROR |
| --- | --- | --- |
| 3 | 6 | Delete "if" and insert -- is --. |
| 3 | 27 | Delete "changer" and insert -- chamber --. |
| 6 | 16 | Delete "atmospehrically" and insert -- atmospherically --. |
| 6 | 21 | Insert -- thus -- after "gas". |
| 6 | 22 | Delete "of". |
| 6 | 50 | Delete "zircal" and insert -- zirca --. |
| 6 | 51 | Delete "zircalloy" and insert -- zircaloy -- |
| 7 | 10 | Delete "getting" and insert -- getter --. |
| 7 | 34 | Delete "and" and insert -- the --. |
| 9 | 24 | Delete "the" and insert -- a --. |

Signed and Sealed this

Thirteenth Day of July 1976

[SEAL]

Attest:

RUTH C. MASON
Attesting Officer

C. MARSHALL DANN
Commissioner of Patents and Trademarks